United States Patent
Salisbury et al.

(10) Patent No.: US 9,507,716 B2
(45) Date of Patent: Nov. 29, 2016

(54) COHERENCY CHECKING OF INVALIDATE TRANSACTIONS CAUSED BY SNOOP FILTER EVICTION IN AN INTEGRATED CIRCUIT

(71) Applicant: ARM LIMITED, Cambridge (GB)

(72) Inventors: Sean James Salisbury, Sheffield (GB); Andrew David Tune, Sheffield (GB); Jamshed Jalal, Austin, TX (US); Mark David Werkheiser, Austin, TX (US); Arthur Laughton, Sheffield (GB); George Robert Scott Lloyd, Sheffield (GB); Peter Andrew Riocreux, Sheffield (GB); Daniel Sara, Sheffield (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/640,599

(22) Filed: Mar. 6, 2015

(65) Prior Publication Data

US 2016/0062890 A1    Mar. 3, 2016

Related U.S. Application Data

(63) Continuation-in-part of application No. 14/468,536, filed on Aug. 26, 2014.

(51) Int. Cl.
*G06F 3/06* (2006.01)
*G06F 12/08* (2016.01)

(52) U.S. Cl.
CPC ......... *G06F 12/0815* (2013.01); *G06F 3/0613* (2013.01); *G06F 3/0647* (2013.01); *G06F 3/0673* (2013.01); *G06F 2212/1021* (2013.01); *G06F 2212/60* (2013.01)

(58) Field of Classification Search
CPC ............. G06F 12/0831; G06F 12/082; G06F 12/0815; G06F 12/0808; G06F 12/0888; G06F 13/1642; G06F 12/0891; G06F 2212/1041; G06F 2212/1021; G06F 2212/60; G06F 2212/621; G06F 3/0613; G06F 3/0647; G06F 3/0673
See application file for complete search history.

(56) References Cited

U.S. PATENT DOCUMENTS 6,810,467 B1 * 10/2004 Khare ................. G06F 12/0822
 711/140
7,698,509 B1    4/2010 Koster et al.
(Continued)

OTHER PUBLICATIONS

Agarwal et al., "In-Network Snoop Ordering (INSO): Snoopy Coherence on Unordered Interconnects", *Department of Electrical Engineering*, Princeton University, No Date, 12 pgs.
U.S. Appl. No. 14/468,536, filed Aug. 24, 2014, Salisbury et al.
UK Search Report issued Jun. 29, 2015 in GB 1500451.8, 4 pages.
U.S. Appl. No. 14/822,953, filed Aug. 11, 2015, Tune et al.
(Continued)

*Primary Examiner* — Hashem Farrokh
(74) *Attorney, Agent, or Firm* — Nixon & Vanderhye P.C.

(57) ABSTRACT

An interconnect has coherency control circuitry for performing coherency control operations and a snoop filter for identifying which devices coupled to the interconnect have cached data from a given address. When an address is looked up in the snoop filter and misses, and there is no spare snoop filter entry available, then the snoop filter selects a victim entry corresponding to a victim address, and issues an invalidate transaction for invalidating locally cached copies of the data identified by the victim. The coherency control circuitry for performing coherency checking operations for data access transactions is reused for performing coherency control operations for the invalidate transaction issued by the snoop filter. This greatly reduces the circuitry complexity of the snoop filter.

22 Claims, 8 Drawing Sheets

(56) References Cited

U.S. PATENT DOCUMENTS

| | | | |
|---|---|---|---|
| 2003/0005237 A1 | 1/2003 | Dhong et al. | |
| 2004/0003184 A1 | 1/2004 | Safranek et al. | |
| 2004/0186963 A1 | 9/2004 | Dieffenderfer et al. | |
| 2006/0224836 A1* | 10/2006 | Blumrich | G06F 12/0822 711/146 |
| 2007/0233965 A1 | 10/2007 | Cheng et al. | |
| 2008/0005485 A1* | 1/2008 | Gilbert | G06F 12/0833 711/146 |
| 2008/0147986 A1* | 6/2008 | Chinthamani | G06F 12/0831 711/141 |
| 2008/0209133 A1 | 8/2008 | Ozer et al. | |
| 2009/0300289 A1 | 12/2009 | Kurts et al. | |
| 2013/0318308 A1 | 11/2013 | Jayasimha et al. | |
| 2014/0095806 A1 | 4/2014 | Fajardo et al. | |
| 2014/0189254 A1 | 7/2014 | Pardo et al. | |
| 2014/0281190 A1* | 9/2014 | Kaushikkar | G06F 9/4411 711/105 |
| 2015/0302193 A1* | 10/2015 | Sara | G06F 21/554 726/23 |

OTHER PUBLICATIONS

ARM, CoreLink, Introduction to AMBA® 4 ACE™ and big.LITTLE™ Processing Technology, Jun. 6, 2011, 15 pages.

Ghosh et al., "Way Guard: A Segmented Counting Bloom Filter Approach to Reducing Energy for Set-Associative Caches", *ISPLED '09*, Aug. 19-21, 2009, pp. 165-170.

Moshovos et al., "JETTY: Filtering Snoops for Reduced Energy Consumption in SMP Servers", *University of Toronto—Electrical and Computer Engineering*, Jan. 2001, 12 pages.

Ranganathan et al., "Counting Stream Registers: An Efficient and Effective Snoop Filter Architecture", Jul. 2012, 8 pages.

Salapura et al., "Design and Implementation of the Blue Gene/P Snoop Filter", IEEE $14^{th}$ International Symposium on High Performance Computer Architecture, Feb. 2008, 10 pages.

Strauss et al., "Flexible Snooping: Adaptive Forwarding and Filtering of Snoops in Embedded-Ring Microprocessors", $33^{rd}$ International Symposium on Computer Architecture, Jun. 2006, 12 pages.

Office Action mailed Feb. 16, 2016 in co-pending U.S. Appl. No. 14/468,536, 36 pages.

* cited by examiner

COHERENCY CHECKING OF INVALIDATE TRANSACTIONS CAUSED BY SNOOP FILTER EVICTION IN AN INTEGRATED CIRCUIT

The present application is a continuation-in-part of U.S. patent application Ser. No. 14/468,536 filed on 26 Aug. 2014, the contents of which are incorporated entirely herein by reference.

BACKGROUND

Technical Field

The present technique relates to the field of integrated circuits. More particularly it relates to coherency control for an interconnect for connecting devices in an integrated circuit.

Technical Background

An integrated circuit may include several devices which may each hold cached copies of data from memory. As several devices may hold data from the same address, it can be important that coherency is maintained between the different versions of the data so that when one device updates data, another device is not still using an old version. An interconnect may manage coherency of data used by a number of devices connected to it.

One way of maintaining coherency is to use a snoop-based mechanism where, when the interconnect receives a read or write transaction from one device for a given address, the interconnect issues snoop transactions to other devices to determine whether another device has cached data from that address. However, as the number of devices increases, snooping all devices to find out whether they have cached data becomes expensive since the snoop traffic increasingly dominates the interconnect bandwidth.

One way of reducing the amount of snoop traffic is to provide a snoop filter which stores data tracking at least some of the data cached by the devices. This allows the interconnect to issue snoop transactions only to those devices identified by the snoop filter as storing the cached data. The present technique seeks to reduce the circuit overhead and improve performance of a system using a snoop filter.

SUMMARY

Viewed from one aspect, the present technique provides an interconnect for connecting devices in an integrated circuit, the interconnect comprising:
coherency control circuitry capable of performing coherency control operations for transactions received by the interconnect from the devices, and determining transactions to be serviced by the devices based on the coherency control operations; and
a snoop filter capable of identifying which devices have cached data for a target address of a transaction received by the interconnect, the snoop filter comprising at least one snoop filter entry for identifying which devices have cached data for a corresponding memory address;
wherein in response to a transaction specifying a target address other than an address having a corresponding snoop filter entry in the snoop filter, the snoop filter is capable of allocating a new snoop filter entry for the target address;
when one or more snoop filter entries which can be allocated for the target address are already allocated to another address, then the snoop filter is capable of selecting a victim snoop filter entry corresponding to a victim address, and issuing an invalidate transaction for invalidating the cached data for the victim address at one or more of the devices; and
the coherency control circuitry is capable of performing the coherency control operations for the invalidate transaction issued by the snoop filter, to determine when the invalidate transaction can be serviced.

Viewed from another aspect, the present technique provides an interconnect for connecting devices in an integrated circuit, the interconnect comprising:
coherency control means for performing coherency control operations for transactions received by the interconnect from the devices, and for determining transactions to be serviced by the devices based on the coherency control operations; and
snoop filter means for identifying which devices have cached data for a target address of a transaction received by the interconnect, the snoop filter means comprising at least one snoop filter entry for identifying which devices have cached data for a corresponding memory address;
wherein in response to a transaction specifying a target address other than an address having a corresponding snoop filter entry in the snoop filter means, the snoop filter means is capable of allocating a new snoop filter entry for the target address;
when one or more snoop filter entries which can be allocated for the target address are already allocated to another address, then the snoop filter means is capable of selecting a victim snoop filter entry corresponding to a victim address, and to issue an invalidate transaction for invalidating the cached data for the victim address at one or more of the devices; and
the coherency control means is capable of performing the coherency control operations for the invalidate transaction issued by the snoop filter means, to determine when the invalidate transaction can be serviced.

Viewed from a further aspect, the present technique provides a coherency control method for an integrated circuit comprising a plurality of devices, the method comprising:
performing coherency control operations for transactions received from the devices, and determining transactions to be serviced by the devices based on the coherency control operations;
in response to a transaction specifying a target address, identifying which devices have cached data for the target address using a snoop filter comprising at least one snoop filter entry for identifying which devices have cached data for a corresponding memory address;
when the target address is an address other than an address having a corresponding snoop filter entry in the snoop filter, allocating a new snoop filter entry for the target address;
when one or more snoop filter entries which can be allocated for the target address are already allocated to another address, selecting a victim snoop filter entry corresponding to a victim address, and issuing an invalidate transaction for invalidating the cached data for the victim address at one or more of the devices; and
performing the coherency control operations for the invalidate transaction issued by the snoop filter, to determine when the invalidate transaction can be serviced, wherein the same coherency control circuitry performs the coherency control operations for both the transactions received from the devices and the invalidate transaction issued by the snoop filter.

Viewed from another aspect, the present technique provides a coherency control device for an interconnect for connecting devices in an integrated circuit, the coherency control device comprising:

a transaction interface capable of receiving data access transactions received by the interconnect from the devices, and receiving invalidate transactions from a snoop filter, the invalidate transactions for invalidating cached data for a victim address at one or more of the devices;

a transaction queue capable of queuing the data access transactions and the invalidate transactions received from the transaction interface; and coherency control circuitry capable of performing coherency control operations for both the data access transactions and the invalidate transactions, and based on the coherency control operations, selecting transactions from the transaction queue for servicing by the devices.

Viewed from another aspect the present technique provides a coherency control device for an interconnect for connecting devices in an integrated circuit, the coherency control device comprising:

transaction interface means for receiving data access transactions received by the interconnect from the devices, and for receiving invalidate transactions from a snoop filter, the invalidate transactions for invalidating cached data for a victim address at one or more devices;

transaction queue means for queuing the data access transactions and the invalidate transactions received from the transaction interface means; and coherency control means for performing coherency control operations for both the data access transactions and the invalidate transactions, and based on the coherency control operations, selecting transactions from the transaction queue for servicing by the devices.

Viewed from a further aspect, the present technique provides a coherency control method for an integrated circuit comprising a plurality of devices; the method comprising:

receiving data access transactions received by the interconnect from the devices;

receiving invalidate transactions from a snoop filter, the invalidate transactions for invalidating cached data for a victim address at one or more of the devices;

queuing the data access transactions and the invalidate transactions in a transaction queue;

performing coherency control operations for both the data access transactions and the invalidate transactions using the same coherency control circuitry; and based on the coherency control operations, selecting transactions from the transaction queue for servicing by the devices.

Viewed from another aspect the present technique provides a snoop filter for an integrated circuit comprising a plurality of devices; the snoop filter comprising:

a data store comprising at least one snoop filter entry for identifying which devices have cached data for a corresponding memory address; and control circuitry capable of determining, in response to a target address, whether the data store comprises a corresponding snoop filter entry for the target address;

wherein when the target address is an address other than an address having a corresponding snoop filter entry in the data store, then the control circuitry is capable of allocating a new snoop filter entry in the data store for the target address; and when one or more snoop filter entries which can be allocated for the target address are already allocated to another address, then the control circuitry is capable of selecting a victim snoop filter entry corresponding to a victim address, and issuing an invalidate transaction to coherency control circuitry separate from the snoop filter, the invalidate transaction for invalidating the cached data for the victim address at one or more of the devices.

Viewed from another aspect, the present technique provides a snoop filter for an integrated circuit comprising a plurality of devices; the snoop filter comprising:

data storage means for storing data, the data storage means comprising at least one snoop filter entry for identifying which devices have cached data for a corresponding memory address; and control means for determining, in response to a target address, whether the data storage means comprises a corresponding snoop filter entry for the target address;

wherein when the target address is an address other than an address having a corresponding snoop filter entry in the data storage means, then the control means is capable of allocating a new snoop filter entry in the data store for the target address; and when one or more snoop filter entries which can be allocated for the target address are already allocated to another address, then the control means is capable of selecting a victim snoop filter entry corresponding to a victim address, and issuing an invalidate transaction to coherency control circuitry separate from the snoop filter, the invalidate transaction for invalidating the cached data for the victim address at one or more of the devices.

Viewed from a further aspect, the present technique provides a method for a snoop filter comprising at least one snoop filter entry for identifying which devices of an integrated circuit have cached data for a corresponding memory address; the method comprising:

in response to a target address, determining whether the snoop filter comprises a corresponding snoop filter entry for the target address;

when the target address is an address other than an address having a corresponding snoop filter entry, then allocating a new snoop filter entry in the data store for the target address;

when one or more snoop filter entries which can be allocated for the target address are already allocated to another address, then selecting a victim snoop filter entry corresponding to a victim address, and issuing an invalidate transaction to coherency control circuitry separate from the snoop filter, the invalidate transaction for invalidating the cached data for the victim address at one or more of the devices.

Further aspects, features and advantages of the present technique will be apparent from the following description of examples, which is to be read in conjunction with the accompanying drawings.

DESCRIPTION OF EXAMPLES

Figure 1:
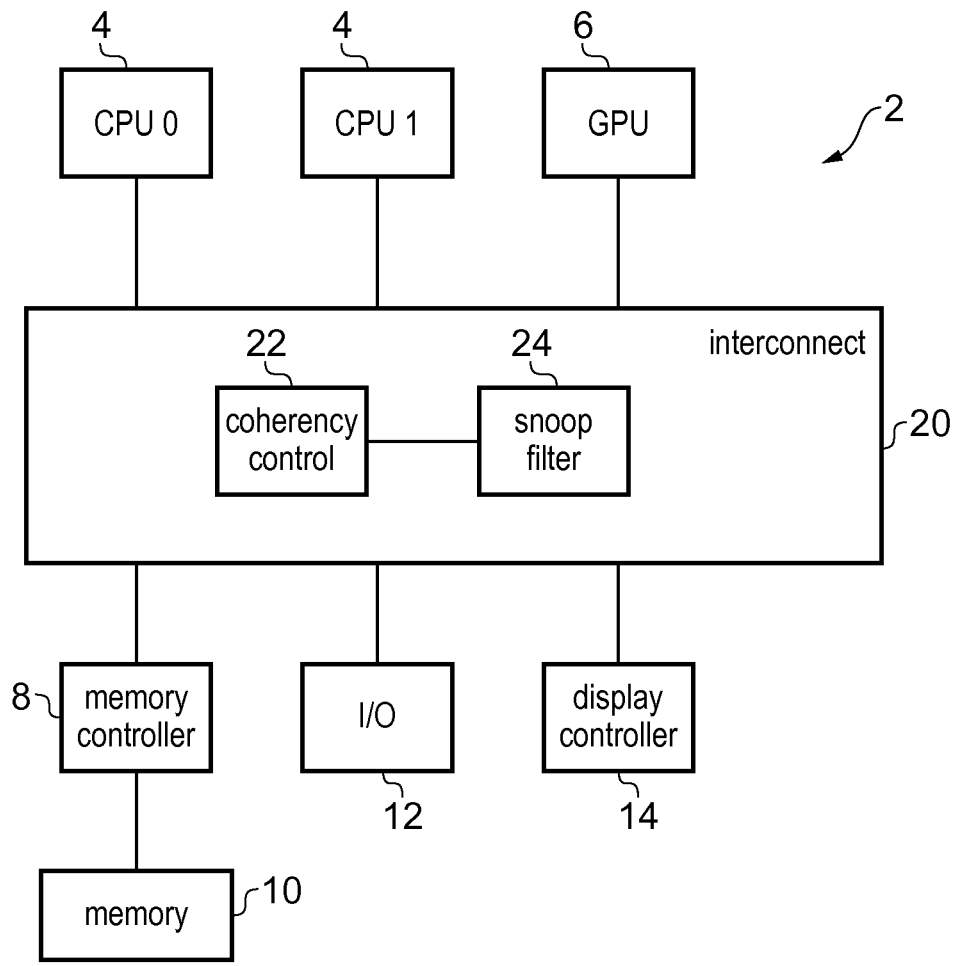
FIG. 1 schematically illustrates an integrated circuit having an interconnect for maintaining coherency between devices.

A snoop filter may have at least one snoop filter entry for identifying which devices have cached data for a corresponding memory address. In response to a transaction specifying a target address, the snoop filter can be looked up to check which devices have cached data for the target address. However, sometimes the snoop filter may not have a snoop filter entry corresponding to the target address of a transaction, and so a new entry may need to be allocated. Sometimes there may be no spare entry available for allocation, if the one or more entries which can be allocated to the target address are already allocated to other addresses. If there is no spare snoop filter entry, then the snoop filter may select a victim snoop filter entry, for allocating as the new snoop filter entry for the target address. The snoop filter also issue an invalidate transaction for invalidating the data associated with the victim snoop filter entry from the cache of one or more of the devices. This avoids potential incoherency which could arise if a device was allowed to keep a cached copy of data which is no longer referenced in the snoop filter.

However, the interconnect may also have received another transaction which targets the same address as the victim address of the invalidate transaction. If so, coherency control operations may be performed for the invalidate transaction, to ensure it and any other transaction for the same address are handled appropriately. One may expect that, since the invalidate transaction is triggered by insufficient space in the snoop filter, then the snoop filter should issue the invalidate transactions. However, handling the additional coherency checking for invalidate transactions within the snoop filter would significantly increase the circuit area and reduce performance of the snoop filter. This is because the coherency control operations would often involve tracking the progress of the invalidate request and any other conflicting transaction, which can require a large amount of additional state storage and monitoring.

The inventors of the present technique recognised that an interconnect may already have coherency control circuitry for performing coherency control operations for transactions which are received by the interconnect from the connected devices. This coherency control circuitry may have tracking resources and circuitry for performing coherency checking. Therefore, this coherency control circuitry can be reused to also check for coherency between an invalidate transaction issued by the snoop filter and other transactions. This greatly reduces the circuit area and increases performance in the snoop filter.

The skilled person would find this extremely counterintuitive, because reusing the coherency control circuitry provided for checking coherency of regular transactions to also handle the coherency control operations for invalidate transactions issued by the snoop filter may introduce a feedback loop, and the skilled person would be concerned that feedback loops could cause deadlock situations to arise.

In particular, in some example implementations the transactions from the coherency control circuitry may be looked up in the snoop filter before they can proceed, while if the coherency control circuitry is reused to handle coherency checking for invalidate transactions from the snoop filter, then the invalidate transactions would be passed back to the coherency control circuitry to be processed. This means there could be some scenarios in which the snoop filter is stalled because it is full and cannot allocate new snoop filter entries until an invalidate transaction is processed, but the coherency control circuitry cannot make progress with the invalidate transaction because it may already be full of pending transactions which are waiting for a snoop filter lookup, causing deadlock. The skilled person would normally seek to avoid any possibility of deadlock by not introducing a feedback loop.

However, the inventors of the present technique recognised that the deadlock can be avoided and that the overall benefit of reducing the circuit area and increasing performance in the snoop filter more than compensates for the additional overhead in taking any measures for deadlock avoidance. The result is an interconnect which has less circuit area and hence less static power consumption and leakage.

The coherency control operations performed by the coherency control circuitry may include any operations which are carried out to maintain data coherency between the devices connected to the interconnect. For example, the coherency control operations may include hazard checking for detecting transactions specifying the same target address. Also, the coherency control operations may include controlling the order in which transactions are serviced. For example, a coherency protocol may specify which transaction should be serviced first when there are a number of transactions specifying the same address, to ensure consistency of data. Many coherency protocols may be used. An example is the AMBA® ACE coherency protocol provided by ARM® Limited of Cambridge, UK. In the case of the invalidate transaction, the coherency control operations may for example check whether there are other transactions for the same address as the victim address being invalidated, and if so, which order the invalidate transaction and other transactions should be processed. This ensures that at the point the other transaction is processed, either the invalidation has not taken place yet, or the invalidation is complete, to avoid potential errors which could arise if the invalidation was partially complete but some steps had not finished yet, such as writebacks or status data updates.

In some cases, the invalidate transaction triggered by the snoop filter may be issued only to the devices which were indicated in the victim snoop filter entry as holding cached data for the victim address. In other systems, invalidate transactions may also be issued to devices which may not be holding the cached data. For example, broadcasting invalidate transactions to all devices regardless of whether they hold cached data for the victim address may be more convenient in some systems to avoid looking up the snoop filter again when the invalidate transaction is processed to find out which devices have the cached data.

The coherency control circuitry may issue the invalidate transaction to the one or more devices, to avoid the snoop filter needing an interface with the other devices. Similarly, while previous snoop filters would normally issue snoops to the devices itself, in the present technique the coherency control circuitry may take care of this. Hence, in response to a transaction specifying a target address, the coherency control may initiate a lookup of the snoop filter to determine which devices have cached data for that address and then issue snoop transactions to the devices identified by the snoop filter as having the cache data for the target address.

While an invalidate request from the snoop filter is pending, the data associated with the victim snoop filter entry may still be needed, so that other transactions to the same address can track which devices have the cached data for that address. Retaining the victim snoop filter entry in the snoop filter until the invalidation is complete would delay servicing other transactions which need a new snoop filter entry to be allocated, so to improve performance the snoop filter may have an eviction buffer for storing evicted entries from the snoop filter. The eviction buffer may function as a temporary extension of the snoop filter so that both the new snoop filter entry and the victim entry which made way for the new entry can be retained in parallel for a time while the invalidate transaction is being processed. Hence, on a miss in the snoop filter, if the snoop filter does not have a spare snoop filter entry which can be allocated for the target address, then the snoop filter may write data from the victim snoop filter entry to the eviction buffer, and then reallocate the victim snoop filter entry to be the new entry for the target address. Such evictions may be relatively rare and the data in the eviction buffer need only be stored for the lifetime of the invalidate transaction and so the eviction buffer may be relatively small. For example, as few as three or four entries in the eviction buffer may be enough. The coherency control circuitry may then look up the eviction buffer in parallel with the normal snoop filter lookups when searching for an entry for a given address.

The data for a given victim address can be removed from the eviction buffer at different times. In general, the coherency control circuitry may issue a signal indicating when the snoop filter can discard the data from the eviction buffer. For example, the signal may indicate that the corresponding invalidate transaction has progressed to a point at which it is committed to state, so that any subsequent transactions are treated as if the data for that victim address is no longer cached by any of the devices. In some examples, the eviction buffer data may be discarded when the corresponding invalidate transaction is issued to the target devices. Also, in some systems another lookup of the snoop filter may be required for the invalidate transaction to determine which devices to send the invalidate transaction to, so on encountering the invalidate transaction again at the snoop filter, this may indicate to the snoop filter that the invalidate is, or will be, committed to state, so that the corresponding data in the eviction buffer can be removed. In other examples, the coherency control circuitry may provide another type of signal specifying a victim address for which data can be removed from the eviction buffer.

The eviction buffer may itself sometimes become full, so that it cannot accept any more victim entries evicted from the snoop filter. This can potentially cause stalls which may prevent progress. To resolve this, a retry mechanism may be provided. When the eviction buffer is full and there is no spare entry available for allocating to a transaction, the snoop filter may issue a retry signal (or "retry response") to the coherency control circuitry to indicate that the transaction cannot be serviced yet and should be retried. In response to the retry signal, the coherency control circuitry may return the retried transaction to an arbitration stage where it may again compete for selection with other transactions. By causing the stalled transaction to be retried, this can open up an opportunity for an invalidate transaction to be selected, to allow data to be removed from the eviction buffer so that reallocations can again take place, resolving the block in progress.

The coherency control circuitry may have a transaction queue which has a number of queue entries for holding candidate transactions that are awaiting servicing. As transactions are received from the other devices connected to the interconnect, or as invalidate transactions are received from the snoop filter, they may fill empty slots in the transaction queue. If all the slots are full, the received transaction may have to wait for arbitration before it can be selected for entry to the queue. Hence, when the queue is entirely full of transactions, it may not be possible to allow further transactions to be processed, including invalidate transactions from the snoop filter. To avoid the risk of deadlock, the transaction queue may have at least one queue entry which is reserved for invalidate transactions issued by the snoop filter. The reserved queue entries cannot be allocated to regular data access transactions received from the devices connected to the interconnect. In this way, at least one invalidate transaction can always enter the transaction queue and so can be serviced. Therefore, even if none of the other transactions can be serviced because the snoop filter is stalled waiting for an invalidation, the invalidate transaction can enter the reserved slot and be processed so that the stall at the snoop filter can be resolved.

Also, the arbitration performed by the coherency control circuitry to decide which of several received transactions is processed first may be such that, when selecting between an invalidate transaction from the snoop filter and transactions received by the interconnect from other devices, the arbitration scheme guarantees at least some opportunities for the invalidate transaction to be selected, so that eventually the invalidate transaction is guaranteed to be selected for being serviced ahead of other transactions received by the interconnect. For example, a round robin or weighted round robin arbitration scheme may be used which gives at least some opportunities for selection to the invalidate transactions. This ensures that when a retry response is returned from the snoop filter as discussed above, the same request which triggered this retry response is not continuously selected and re-presented to the snoop filter, and instead an invalidate transaction can be selected in the arbitration so that the invalidate transaction can unblock the stall at the snoop filter.

Hence, any risk of deadlock can be eliminated using these three techniques in combination: reserving at least one slot in the transaction queue for invalidate requests, using a fair arbitration scheme which cannot continue to select the same transaction again and again for an infinite time, and providing a retry mechanism for the snoop filter to return transactions to the coherency control circuitry to repeat the arbitration. However, these measures are not essential for all implementations as in some examples the deadlock may not arise.

Another technique for preventing deadlock may be to prevent transactions other than invalidate transactions from progressing beyond a predetermined point when the eviction buffer is full. This may address deadlocks which could arise in some example implementations when a first transaction is stalled because it requires an invalidation and the eviction buffer is full, and this transaction itself causes other transactions to be blocked including an invalidate transaction which needs to be processed in order to make space in the eviction buffer so that the first transaction can be unstalled. By preventing transactions other than invalidate transactions from progressing beyond a predetermined point when the eviction buffer is full, transactions which progress beyond this point will always have sufficient space in the eviction buffer if they need to trigger an invalidate transaction, and so this type of deadlock cannot arise.

There are various ways in which transactions could be prevented from progressing beyond the predetermined point when the eviction buffer is full. One technique is to provide a credit mechanism within the coherency control circuitry and/or the snoop filter, which provides a predetermined number of credits corresponding to the number of entries available in the eviction buffer. In response to a transaction (other than an invalidate transaction) progressing beyond the predetermined point, a credit is consumed. In response to completion of an invalidate transaction or a determination that a transaction other than an invalidate transaction will not itself trigger an invalidate transaction, a credit is released. In this context, consuming or releasing a credit "in response to" an event means that the credit is consumed or released at some time after the corresponding event has happened (which could be immediately or some time later). The coherency control circuitry may prevent non-invalidate transactions progressing beyond the predetermined point if the predetermined number of credits have been consumed but not yet released. This ensures that a non-invalidate transaction can only pass the predetermined point if there is a credit remaining, indicating that there will be at least one spare entry in the eviction buffer for tracking an invalidate transaction if required, to avoid the deadlock issue described above.

As mentioned above, one of the coherency control operations performed for transactions may be hazard checking. For example, the coherency control circuitry may ensure that transactions specifying the same address are handled in a certain order. One way of doing this is to provide a "point of serialization" beyond which a transaction may not progress if there is an unserviced transaction for the same address still pending beyond the point of serialization.

In some embodiments, the predetermined point (beyond which transactions are prevented from progressing when the eviction buffer is full) may be the point of serialization. Once a transaction progresses beyond the point of serialization, this may block later transactions to the same address, including invalidate transactions. By preventing non-invalidate transactions from progressing beyond the point of serialization when the eviction buffer is full, this ensures that the invalidate transaction will be able to progress, so that space will be made available in the eviction buffer again and other transactions which require invalidations in the snoop filter do not become stalled.

This technique of preventing progress of transactions beyond the predetermined point when the eviction buffer becomes full may not be required for all implementations, since the deadlock may not arise at all in some examples. However, it is particularly useful in examples which impose an ordering requirement on certain groups of transactions. For example, for at least one group of transactions, the coherency control circuitry may be constrained to process the transactions in a certain order. For example, the source device issuing the transactions may mark the group of transactions with a certain identifier, and the transactions may have to be serviced in the same order as the transactions are received. In this case, the credit mechanism or other mechanism for restricting progress of certain transactions beyond the point of serialization may be very useful for preventing deadlocks caused by the ordering requirement and the address hazard checking at the point of serialization.

In some cases the coherency control circuitry and the snoop filter may be provided in separate circuits, which can later be combined into an interconnect or integrated circuit. Hence, a coherency control device may receive both data access transactions from the devices, and invalidate transactions from the snoop filter, and the same coherency control circuitry may be used to perform coherency control operations for both the data access transactions and the invalidate transactions to select transactions for servicing, so that the snoop filter can be made smaller.

To reduce risk of deadlock, the coherency control device may have a transaction queue with at least one transaction queue entry which is reserved for invalidate transactions. Also, the coherency control circuitry may perform arbitration using an arbitration scheme which guarantees at least some opportunities for invalidate transactions to be serviced.

Similarly, the snoop filter may be provided independently. In response to a target address of a transaction, the snoop filter may look up a corresponding snoop filter entry and if it does not have one then a new entry can be allocated. If there is no spare entry which can be allocated for the target address, then a victim entry is selected and the snoop filter issues an invalidate transaction to coherency control circuitry which is separate from the snoop filter, for invalidating the cache data for the victim address at one or more devices.

As discussed above, the snoop filter may have an eviction buffer to which the victim snoop filter entry can be written while the invalidate request is being processed, and having written the victim snoop filter entry to the eviction buffer, the new snoop filter entry can be allocated in the snoop filter. The snoop filter may look up the eviction buffer in parallel with the snoop filter data store. If the eviction buffer becomes full then the snoop filter may transmit a retry signal to the coherency control circuitry to indicate that a transaction associated with the target address should be retried later. In response to a signal from the coherency control circuitry indicating that data can be evicted from the eviction buffer for a given address, the snoop filter control circuitry may evict this data from the eviction buffer.

FIG. 1 schematically illustrates a data processing apparatus 2 having a number of devices including one or more processors (CPUs) 4, a graphics processor (GPU) 6, a memory controller 8 for controlling access to a memory 10, an input/output device 12 for communicating with a peripheral or external device such as an Ethernet interface for example, and a display controller 14 for controlling display of data on a display device. It will be appreciated that many other types of devices could be connected to the interconnect 20. Typically, the devices may include master devices (such as a CPU 4 or GPU 6) which can initiate data access transactions, and slave devices (such as the memory controller 8 or I/O device) which may service the transactions. Some devices may be able to function both as a master device and as a slave device.

The devices are connected to an interconnect 20 which manages communication between the devices. Some of the devices may have a local cache for storing cached versions of data from the memory 10. More than one device may cache data from the same address and so the interconnect 20 is provided to maintain coherency within the system. The interconnect 20 has coherency control circuitry 22 for performing coherency control operations for transactions issued by the devices, and a snoop filter 24 for tracking which devices hold cached copies of data.

The coherency control circuitry 22 (which may also be referred to as point of serialisation control circuitry) may perform various coherency management operations, including for example hazard detection for detecting when multiple transactions target the same address, ordering enforcement for ensuring that transactions targeting the same address are handled in a known and predictable order to maintain coherency, and arbitration operations for selecting which of several pending transactions to the same address should be serviced when. Various coherency protocols may be used to ensure coherency. An example is the ARM® AMBA® ACE protocol provided by ARM® Limited of Cambridge, UK.

Figure 2:
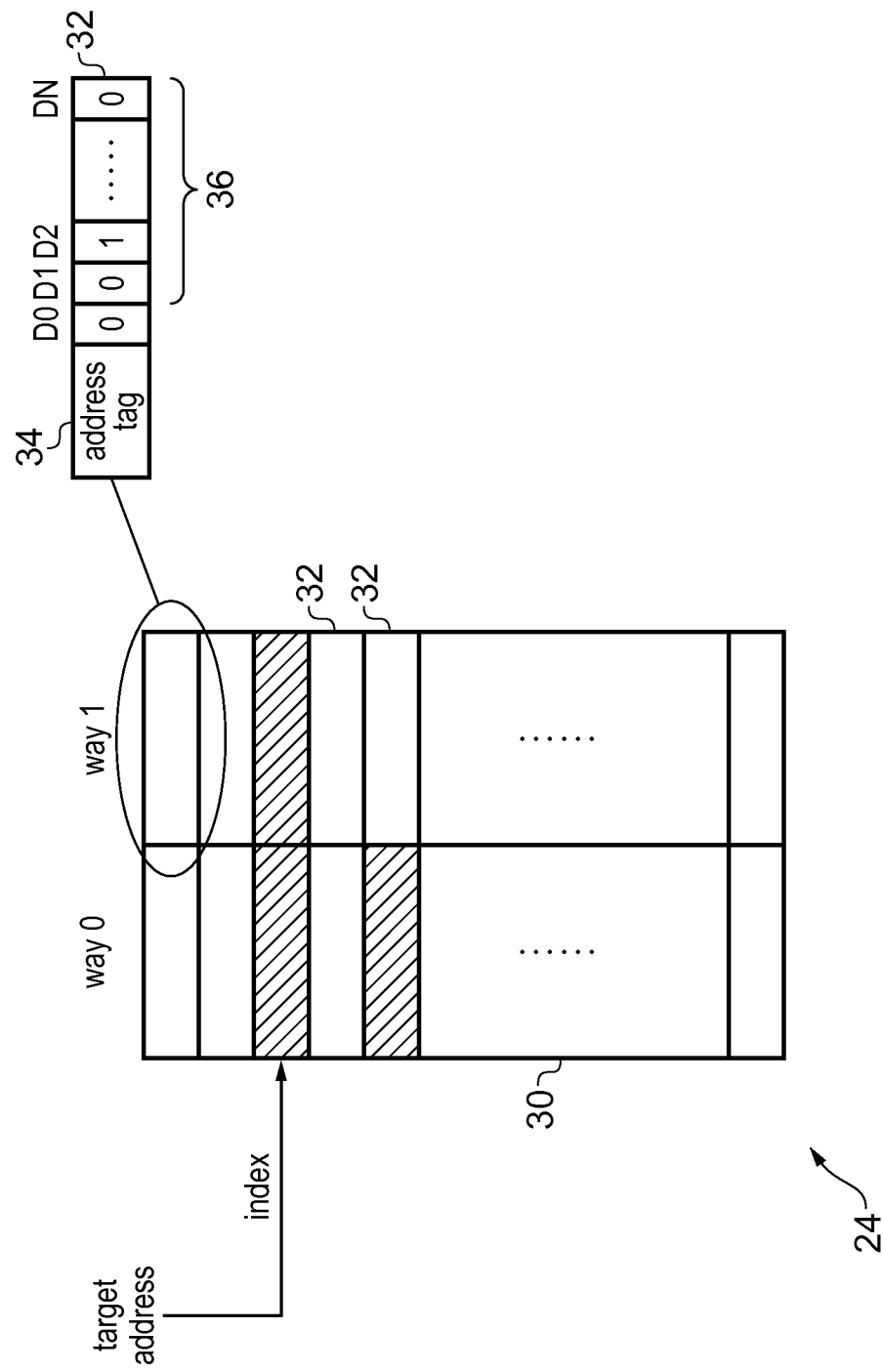
FIG. 2 shows an example of a snoop filter for determining which devices have cached data corresponding to a target address.

FIG. 2 shows an example of part of the snoop filter 24. The snoop filter 24 has a data store 30 having a number of entries 32. In this example, the data store 30 has a set-associative structure, so that the entry for a given target address can only be stored in one of a limited set of locations indexed based on the address. In the example of FIG. 2, the associativity is 2, so there are two entries available for storing any one address. It will be appreciated that the data store could have a greater associativity than 2, or that a direct mapped or fully-associative structure could be used instead of a set-associative structure. Each snoop filter entry 32 holds an address tag 34 identifying the part of the corresponding address which was not used to index into the entry 32, and a set of device indicating bits 36. Each bit 36 corresponds to one of the devices 4, 6 which could hold cached data and indicates whether or not that device currently has valid cached data for that address. Not all the devices need to have a corresponding indicator bit 36 as some devices may not have a cache. Optionally, in some cases each snoop filter entry 32 may also include other information, such as coherency status information indicating for example whether the cached data is shared or unique, or clean or dirty. While FIG. 2 shows an example with a single bank of snoop filter entries, in some cases multiple snoop filter banks may be provided which can be looked up in parallel.

In response to a data access transaction specifying a target address, the coherency control circuitry 22 looks up the target address in the snoop filter 24 to determine which devices hold cached data for the address. Hence, the target address is input to the snoop filter 24, which uses an index portion of the address to select the corresponding set of entries 32. The snoop filter 24 then compares the tag portions of each entry within that set against the tag portion of the target address, to determine whether they match. If there is a tag match (i.e. a snoop filter hit), then a hit signal is returned to the coherency control circuitry 22 together which the indicator bits 36 of the entry whose tag 34 matched the target address. The coherency control circuitry 22 initiates snoop transactions to the devices indicated by the indicator bits 36 as holding cached data. This allows the number of snoop transactions to be filtered so that it is not necessary to send snoop transactions to devices which do not have the data. When responses to the snoop transactions are received from the devices, the snoop filter 24 is updated based on the snoop responses. For example, if a device has invalidated its copy of the data then the snoop filter may be updated to indicate that the device no longer has the cached data.

In some examples, the snoop filter 24 may be an inclusive snoop filter which means that the snoop filter 24 contains a record of all data that is cached by the devices. Hence, whenever some data is allocated to the cache of one of the devices, the snoop filter is updated accordingly. However, the snoop filter may allow some inaccuracy concerning invalidations from the local caches of the devices, as some of the devices may not always inform the interconnect 20 when data is invalidated from its cache, and so sometimes the snoop filter 24 may still indicate that the device has the cached data, when actually it no longer has it. Hence, occasionally there may be some additional snoop transactions generated which are sent to devices which do not actually have the cached data. In response to such snoop transactions, the device responds indicating that it does not have the data, and then the snoop filter can be updated so that on a following transaction to the same address, that device will no longer be snooped. Nevertheless, when using an inclusive snoop filter, it can be important to ensure that a device cannot hold cached data unless the snoop filter indicates that it is holding the data. Otherwise, when another device accesses the same address, no snoop transaction would be triggered to the device not indicated in the snoop filter, and so incoherency could arise.

If in response to a given transaction, the snoop filter 24 is looked up and there is no corresponding entry 32 for the target address of the transaction, then a new entry can be allocated by the snoop filter 24. For example, each entry may have a valid bit (not shown in FIG. 2) which indicates whether the entry is valid, and on allocating a new entry, an entry in the set corresponding to the target address having the valid bit cleared may be selected.

However, if all the entries in the set are already taken, then the snoop filter may evict an entry and allocate that entry for the new address. The victim entry may be selected using any known victim selection technique. For example, a least recently used (LRU) or pseudo least recently used policy may be useful, since generally the least recently used data value is less likely to be used again in future than more recently accessed data values.

However, on invalidating a victim entry in the snoop filter, this would mean that snoop transactions would no longer be generated for the corresponding victim address, which could lead to incoherency if the devices continue to cache the data from the victim address. Therefore, to maintain coherency the snoop filter 24 triggers an invalidate transaction (e.g. the CleanInvalid transaction in the ARM® AMBA® ACE protocol) to be issued to at least those devices which held the cached data for the victim address (in some cases the invalidate transaction may also be broadcast to other devices). In response to the invalidate transaction, the device invalidates its cached copy of the data, and if the data is dirty, writes the data back to memory 10. This avoids an inconsistency between the snoop filter tracking data and the data in the local caches, to ensure coherency.

However, having issued the invalidate transaction, there may also be other transactions which have been received from one of the devices, targeting the same address as the victim address associated with the invalidate transaction. If so, coherency should be maintained between the invalidate transaction and the other transaction for the same address. Providing circuitry in the snoop filter 24 for checking for such hazards and controlling the servicing of these transactions to maintain coherency would greatly increase the overhead of the snoop filter. This require the snoop filter to track snoops for the lifetime of the corresponding transaction and to be capable of updating the snoop filter contents based on the snoop response, which would require a significantly larger tracking structure in the snoop filter to maintain performance based on snoop round trip latency. Also, additional coherency address hazarding logic would be required within snoop filter bank to guard against subsequently allocating transactions to the same address as an outstanding back invalidate.

In practice, the coherency control circuitry 22 already has data storage and hazarding logic for performing coherency control and ordering operations so this can be reused to manage coherency of invalidate transactions, in a similar way to regular transactions. Hence, the invalidate transactions triggered by the snoop filter may be fed back to the coherency control circuitry 22 for coherency management, so that performance can be improved and the circuit scale of the snoop filter 24 can be reduced.

Figure 3:
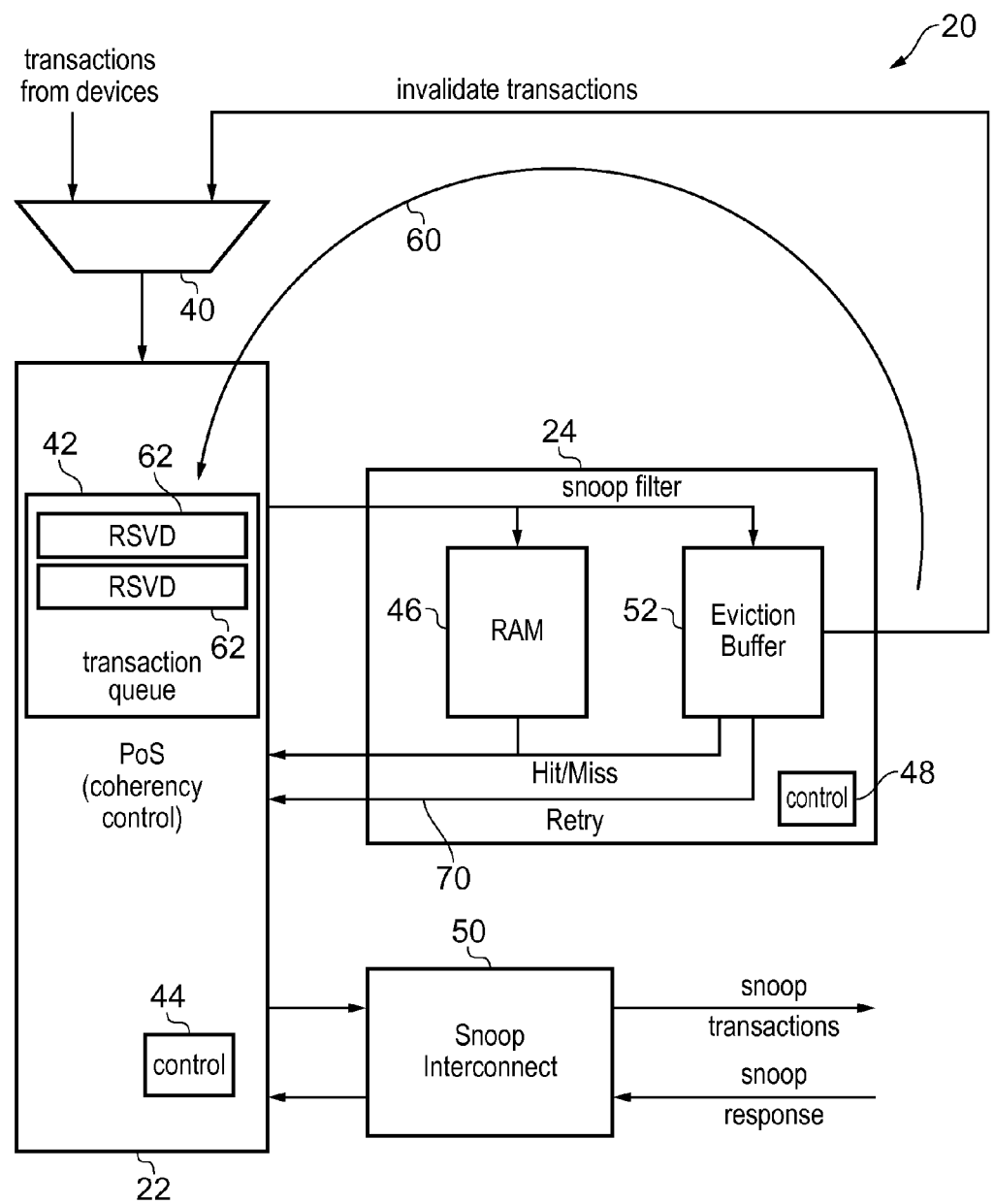
FIG. 3 shows an example of reusing coherency control circuitry for handling invalidate transactions issued by the snoop filter.

FIG. 3 shows an example of a part of the interconnect 20 which reuses the coherency control circuitry 22 to handle coherency checking of invalidate transactions triggered by the snoop filter 24 in response to snoop filter conflicts. A multiplexer 40 receives data access transactions from the devices connected to the interconnect 20 and also receives invalidate transactions from the snoop filter 24. The multiplexer 40 selects between the data access and invalidate transactions, and inputs the selected transactions to the coherency control circuitry 22. The coherency control circuitry 22 has a transaction queue 42 for queuing transactions which are awaiting servicing (for example, the transactions may be waiting for snoop responses to be received, or for other transactions to be issued first to maintain an ordering appropriate to the coherency protocol). The coherency control circuitry 22 has control logic 44 for controlling the coherency control operations.

The snoop filter 42 has control circuitry 48 for controlling it to perform lookups and evictions and to generate invalidate transactions. The coherency control circuitry 22 looks up the snoop filter 24 for a target address of a transaction in the queue 42. The coherency control circuitry 22 may perform the lookup of the snoop filter 24 in parallel with other types of coherency checking operations such as hazard detection and ordering enforcement. The snoop filter 24 looks up the address in its snoop data store (RAM) 46 and returns a hit/miss indication depending on whether it found a corresponding snoop filter entry. If the address hits in the snoop filter 24, then a snoop vector comprising the indicator bits 36 from the corresponding entry is also provided to the coherency control circuitry 22. If a hit occurred, then the coherency control circuitry 22 initiates snoop transactions to any devices which were indicated by the snoop filter 24 as having cached data, and issues the snoop transactions to a snoop interconnect unit 50 which then controls issuing of the snoop transactions to the targeted devices. When a response to the snoop transactions is received, the coherency control circuitry 22 updates the snoop filter 24 based on the responses, and also controls processing of the transactions which initiated the snoop filter lookup based on the snoop responses.

If a target address misses in the snoop filter 24, a new entry is allocated. If there is not enough space for this, then a victim entry is selected and evicted. The evicted entry is placed in an eviction buffer 52 within the snoop filter 24, and the eviction buffer 52 then generates an invalidate transaction corresponding to the victim address. The invalidate transaction is sent to the multiplexer 40 to be input into the transaction queue 42. When the data from the victim entry has been written into the eviction buffer 52, the evicted entry can be reallocated to the target address of the transaction which triggered the eviction.

On snoop filter lookups, target addresses are looked up in both the snoop filter RAM 46 and the eviction buffer 52, since the data corresponding to the evicted entry in the eviction buffer 52 has not yet been invalidated from the local caches of the devices, and so coherency still needs to be maintained with this data. Hence, the eviction buffer 52 acts as a temporary extension of the snoop filter so that both the old and new snoop filter entries can be accommodated for a time while the invalidation is being carried out. The eviction buffer 52 can be looked up in parallel with the snoop filter RAM 46.

An entry can be removed from the eviction buffer 52 by the snoop filter 24 when the corresponding invalidate transaction has reached a point at which the invalidation from the local caches is committed to state. In some cases this may be when the coherency control circuitry 22 issues the invalidate transaction to the devices, or at another arbitrary timing. However, in the present embodiment the invalidate transaction may itself need to be looked up in the snoop filter 24 to find out which devices to send the invalidate transaction to (at this point, the invalidate transaction will hit in the eviction buffer 52 rather than the RAM 46). This may signal to the snoop filter that the invalidation will now be committed to state, so in response to encountering the invalidate transaction, the snoop filter 24 may remove the corresponding entry from the eviction buffer 52.

To reduce the hardware complexity and increase performance at the snoop filter, this technique introduces a feedback loop 60, which one may expect could risk introducing deadlock situations where no transactions can make progress. In general, progress of transactions from the coherency control circuitry 22 may depend on the transactions being looked up in the snoop filter to determine which devices need to be snooped. However, if the eviction buffer 52 becomes full then no more evictions from the RAM 46 may be possible until a space becomes available in the eviction buffer 52. Space may not become available in the eviction buffer 52 until an invalidate transaction is processed by the coherency control circuitry 22, but if the transaction queue 42 is already full then this may not be possible, and so this could lead to deadlock if not handled carefully. For this reason, the feedback loop 60 provided between the coherency control circuitry 22 and snoop filter 24 goes strongly against the standard practice for these types of systems, which is to avoid feedback loops.

However, the inventors realised that deadlock can be avoided by providing certain measures in the interconnect 20. The transaction queue 42 may include at least one reserved queue entry 62 which is reserved solely for invalidate transactions issued by the snoop filter 24 and so cannot be allocated to a data access transaction received from a device. This ensures that at least one invalidate transaction can always be presented back to the snoop filter to enable an eviction buffer entry to be cleared to resolve the deadlock.

Also, a retry mechanism may be provided to allow a lookup slot at the snoop filter 24 to be cleared to make way for an invalidate transaction. If the eviction buffer 52 is full and another transaction misses in the snoop filter so it is not possible to allocate a new entry, then the snoop filter may assert a retry signal 70 which signals to the coherency control circuitry 22 that the transaction which missed in the snoop filter 24 should be retried later. In response to the retry signal 70, the coherency control circuitry 22 may initiate a snoop filter look up for a different transaction. By forcing the coherency control circuitry to retry a lookup for another transaction when the eviction buffer is full, this provides an opportunity for an invalidate transaction to be looked up in the snoop filter, at which point an entry in the eviction buffer 52 can be removed so that reallocations in the snoop RAM 46 can take place.

Also, the coherency control circuitry 22 may perform arbitration between different transactions in the transaction queue 42 to select which transaction should be looked up in the snoop filter. With respect to invalidate transactions, the coherency control circuitry 22 may use a fair arbitration scheme which ensures that invalidate transactions have an opportunity to be selected for looking up in the snoop filter 24. For example, a round robin or weighted round robin scheme may be used to ensure that, over a certain number of arbitrations, there will be at least some opportunities for an invalidate transaction to be selected. This ensures that if the eviction buffer 52 is full and a transaction is retried, the coherency control circuitry will not continually keep selecting the retried transaction again, and instead eventually will select the invalidate transaction instead for looking up in the snoop filter 24.

Hence, the reserved slot(s) 62 in the transaction queue, the retry mechanism 70 and the fair arbitration scheme ensure that deadlocks cannot arise despite the feedback loop 60, resulting in a more efficient interconnect overall because the snoop filter 24 requires much less tracking circuitry and the snoop filter's performance is not limited by enforcing ordering of invalidate transactions with respect to other transactions.

Figure 4:
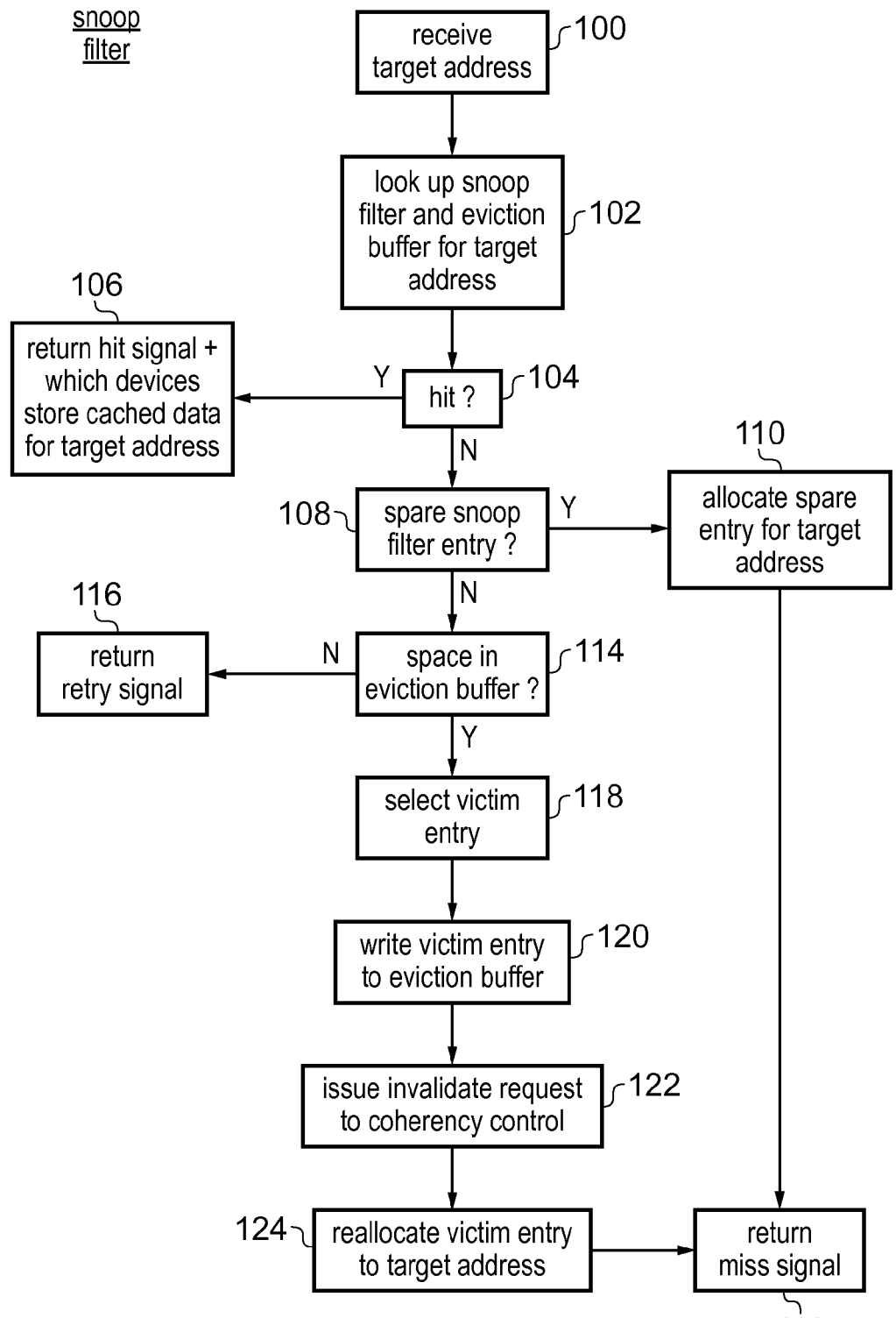
FIG. 4 is a flow diagram showing an example of operations performed by the new snoop filter.

FIG. 4 is a flow diagram showing an example of operations at the snoop filter 24, which are performed under control of the control circuitry 48. At step 100 a target address is received from the coherency control circuitry 22. At step 102 the snoop filter looks up the snoop filter RAM 46 and the eviction buffer 52 to check whether it has an entry corresponding the target address. At step 104, the snoop filter control circuitry 48 determines whether there is a hit in either the RAM 46 or the eviction buffer 52. If so, at step 106 a hit signal is returned to the coherency control circuitry 22 together with an indication of which devices have cached data for the target address.

On the other hand, if the target address missed in both the snoop filter 46 and the eviction buffer 52 then at step 108 it is determined whether there is a spare snoop filter entry which can be allocated for the target address (e.g. an invalid entry in the set indexed by the target address). If there is a spare entry, then at step 110 the spare entry is allocated as a new entry for the target address. At step 112 a miss signal is returned to the coherency control circuitry to indicate that the coherency control circuitry does not need to snoop any devices.

On the other hand, if there were no spare snoop filter entries at step 108, then at step 114 it is determined whether there is space in the eviction buffer 52. If not, then at step 116 the retry signal 70 is asserted to trigger the coherency control circuitry 22 to retry the snoop filter lookup for the current transaction later, and allow a different transaction to be looked up in the snoop filter, which may be an invalidate transaction which would allow data to be removed from the eviction buffer 52.

If there was space in the eviction buffer 52 then at step 118 a victim entry is selected, e.g. using a victim selection policy such as LRU or pseudo LRU. At step 120 the data from the selected victim entry is written to the eviction buffer 52. At step 122, the eviction buffer 52 generates an invalidate transaction for the victim address of the selected victim entry, and the invalidate transaction is sent to the multiplexer 40 for inputting to the coherency control circuitry 22. At step 124, the victim entry is cleared and the tag of the victim entry updated to indicate the tag portion of the target address which caused the snoop filter miss. The miss signal is then returned at step 112.

Figure 5:
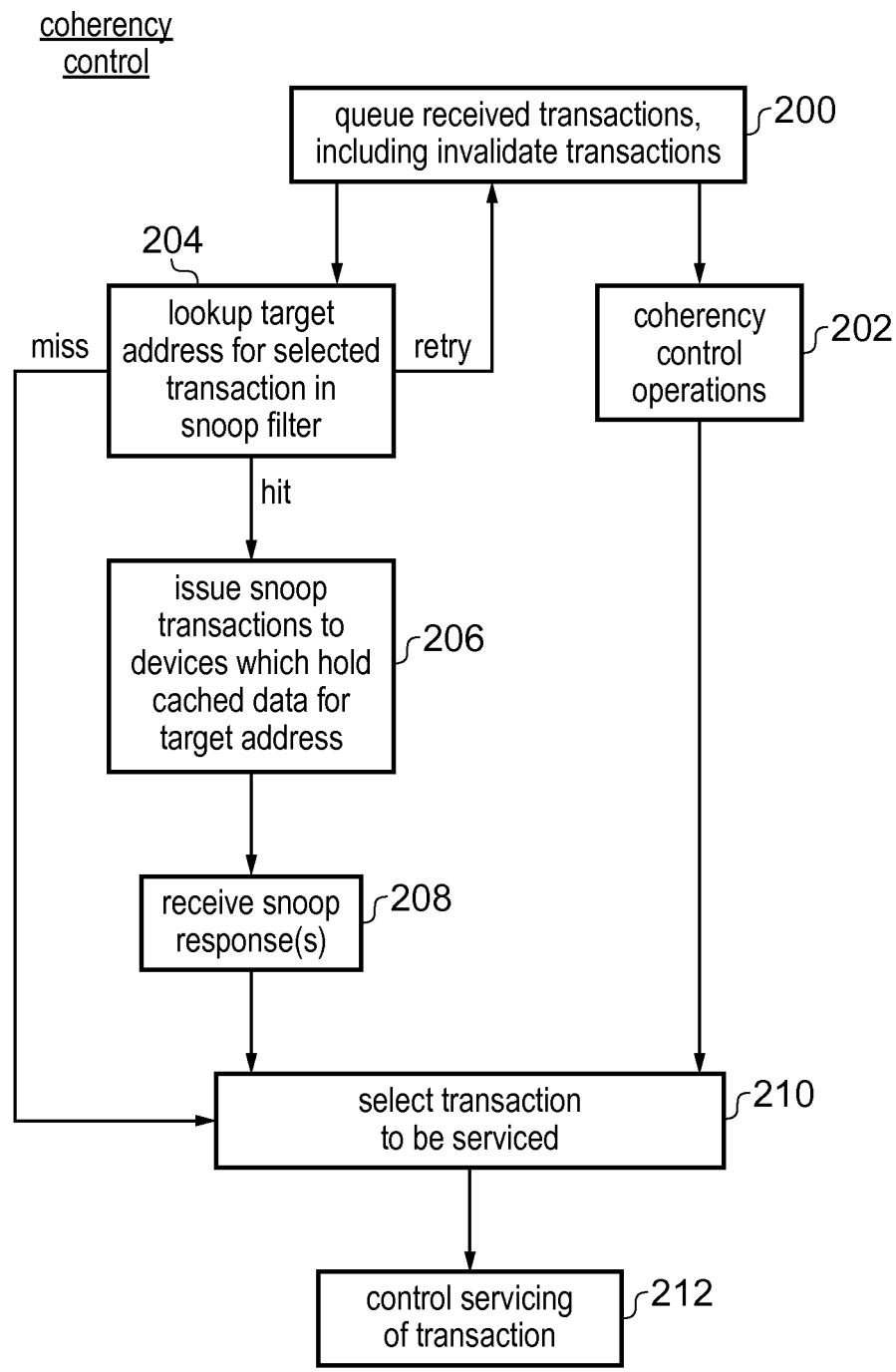
FIG. 5 is a flow diagram showing an example of operations performed by the coherency control circuitry.

FIG. 5 is a flow diagram showing an example of operations performed by the coherency control circuitry 22. At step 200 the coherency control circuitry 22 queues received transactions in the transaction queue 42. The queue may include both data access transactions from devices connected to the interconnect and invalidate transactions from the snoop filter 24. At step 202 the device 22 performs coherency control operations, such as hazard checking and ordering enforcement operations.

Also, at step 204 the coherency control circuitry 22 selects a transaction from the transaction queue and looks up its target address in the snoop filter. The arbitration policy for selecting the transaction to be looked up may use a fair arbitration scheme which guarantees that an invalidate transaction can eventually be selected. The snoop filter lookup may take place in parallel with the coherency control operations 202, or before or after the coherency control operations 22 as appropriate. If the address hits in the snoop filter then at step 206 the coherency control circuitry 22 issues snoop transactions to the devices indicated by the snoop filter 24 as holding cached data for the target address. When snoop responses are received at step 208, the coherency control circuitry 22 controls the snoop filter to update the bit indicators 36 for the snooped address to update which devices have the cached data. On the other hand, if there was a miss in the snoop filter 24 then steps 206 and 208 are omitted. If the lookup resulted in a retry signal 70 being sent by the snoop filter 24, then following step 204 the method returns to step 200 where the coherency control circuitry 22 selects a different transaction to look up in the snoop filter.

At step 210, the coherency control circuitry selects a transaction for which the snoop filter lookup is complete (either a miss response was received or a hit occurred and snoop responses have been received from all the snoop devices), and which is also allowed to be serviced as determined in the coherency control operations 22. The coherency control circuitry 22 then controls servicing of the transaction by the devices at step 212.

Figure 6:
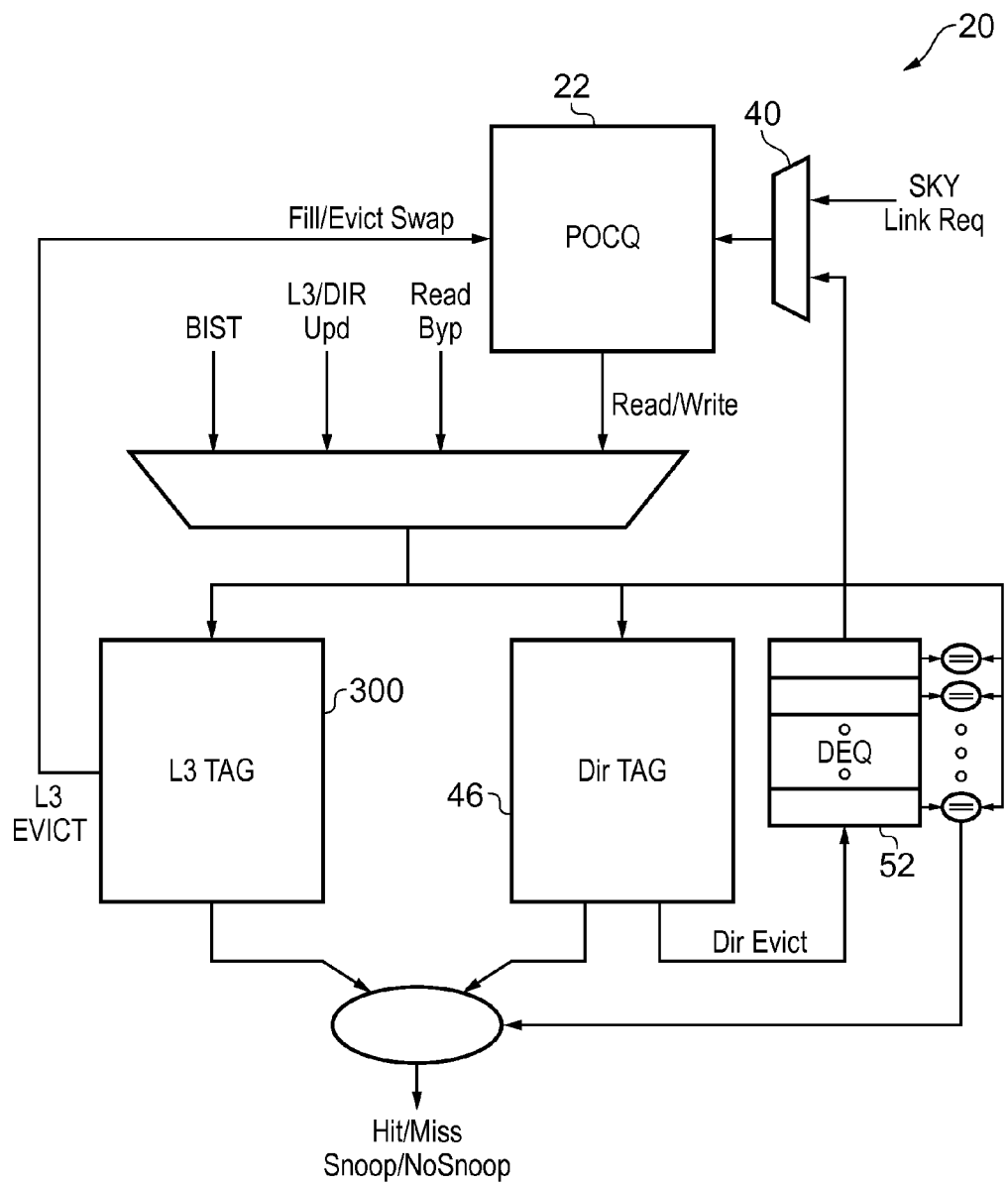
FIG. 6 shows a second example of the snoop filter and the coherency control circuitry.

FIG. 6 shows another example of circuitry within the interconnect. The elements which are the same as in FIG. 3 are shown with the same reference numeral. This example differs in that the interconnect also checks whether data associated with a given address is stored in a level 3 (L3) cache, using an L3 tag structure 300 which is used in a similar way to the snoop filter. Hence, L3 eviction operations may similarly cause invalidate requests which feed back to the coherency control circuit 22. Essentially the L3 cache can be viewed as another device which may cache copies of data, and so the L3 tag structure 300 may simply be viewed as another way of the snoop filter. Also, the example shown in FIG. 6 has the additional capability of injection memory testing operations (GIST). This example works in the same way as the example of FIG. 3, in that an entry is placed in the eviction buffer 52 (DEQ) when a capacity conflict occurs and then arbitrated into the coherency control circuitry (POCQ) 22. However, in this example, the snoop filter 24 does not have a retry mechanism 70 as in FIG. 3. In the example of FIG. 6, an invalidate transaction may be broadcast to all devices regardless of whether they are actually holding the cached data (this approach may be selected if the snoop filter is not an inclusive snoop filter and so may not track all the data that is cached). In this case, there is no need to perform a snoop filter lookup for invalidate transactions, and so the deadlock issue discussed above cannot arise. Therefore, the retry mechanism is not essential. As the invalidate transaction is not presented back to the snoop filter, the eviction buffer (DEQ) entries can be de-allocated in response to an explicit de-allocate signal from the coherency control circuitry 22, instead of on looking up the snoop filter for the invalidate transaction as in the earlier example.

While FIG. 1 shows the coherency control circuitry 22 and snoop filter 24 being provided within the same device in an interconnect, it is also possible to provide these as separate devices within the data processing apparatus. For example, the coherency control circuitry 22 and snoop filter may be provided on separate integrated circuits or FPGAs.

Figure 7:
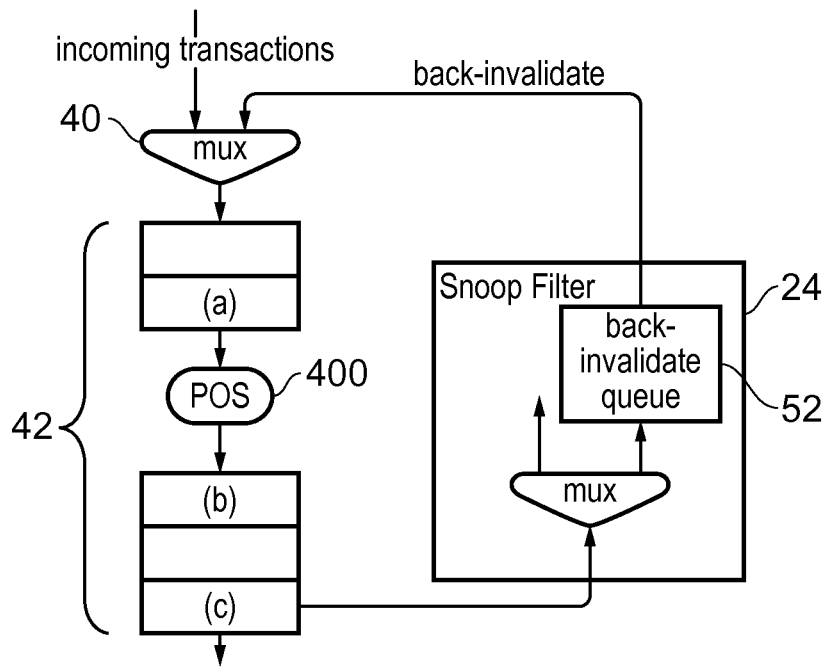
FIG. 7 shows a potential deadlock which may occur in some example implementations.

FIG. 7 shows an example of a potential deadlock which may arise in some example implementations (in the absence of any preventative measures as discussed below). Some systems may allow a master device to indicate that a certain group of transactions should be handled in a particular order. For example, each transaction may have a corresponding transaction identifier (ID) value set by the device which issued the transaction, and the transactions which have the same transaction ID may be considered to form a group of transactions which must be serviced in a predetermined order. Alternatively, the group of transactions may be transactions of a certain type for which a particular ordering is required. The predetermined order could be any desired order. For example, the device which issued the transaction may include an ordering value in each transaction of the group, to specify the order in which the transaction should be handled with respect to other transactions of the same group. However, often it may be simpler if the predetermined order for the group of transactions is the same as the order in which the transactions were received from the master device. In implementations which do not allow master devices to impose such an ordering requirement, the deadlock described below may not arise, and so the techniques described below would not be essential.

For conciseness, FIG. 7 shows the multiplexer 40 of FIG. 3, a portion of the transaction queue 42 of the coherency control circuitry 22, and the eviction buffer (back invalidate queue) 52 of the snoop filter 24, but does not show the other elements of FIG. 3. As shown in FIG. 7, the transaction queue 42 may include a point of serialization (POS) 400 which represents the point at which address hazards are set up. To ensure coherency, a transaction may pass the POS 400 if there are no other transactions for the same address beyond the POS 400 which have not yet been serviced. The point at which a transaction is considered to have been serviced may vary between different implementations. For example the transaction may be considered serviced when the transaction is issued to its destination device, or when the destination device has acknowledged the transaction. By restricting progress of transactions beyond the POS 400 in this way, it can be ensured that successive transactions for the same address are handled in a predictable way. Either side of the POS, the coherency control circuitry may reorder transactions, since before the POS no address hazard has yet been set up and after the POS there is guaranteed to be only one unserviced transaction to a given address. Any such reordering is subject to any ordering requirement imposed on a group of transactions, e.g. using the transaction ID as discussed above.

When address hazarding dependencies may prevent transactions (including invalidate transactions) from passing beyond the POS 400, and there is also an ordering requirement for a group of transactions, a deadlock could arise in the situation shown in FIG. 7. In this example, transaction (a) is an invalidate transaction which is stalled before the POS 400 because it specifies the same address as a transaction (b) beyond the POS 400 which specifies the same address as the invalidate transaction (a). However, transaction (b) is itself stalled because it specifies the same transaction ID as a third transaction (c) and so is subject to the ordering requirement, so that transaction (b) should be serviced after transaction (c). However, transaction (c) is stalled because it requires a new entry to be allocated in the snoop filter, but an entry cannot be allocated because the eviction buffer (back invalidate pipeline) 52 is already full. However, space cannot be made available in the eviction buffer 52 because the invalidate transaction (a) is stalled. Therefore, none of transactions (a), (b) and (c) can progress, and so there is a deadlock.

Figure 8:
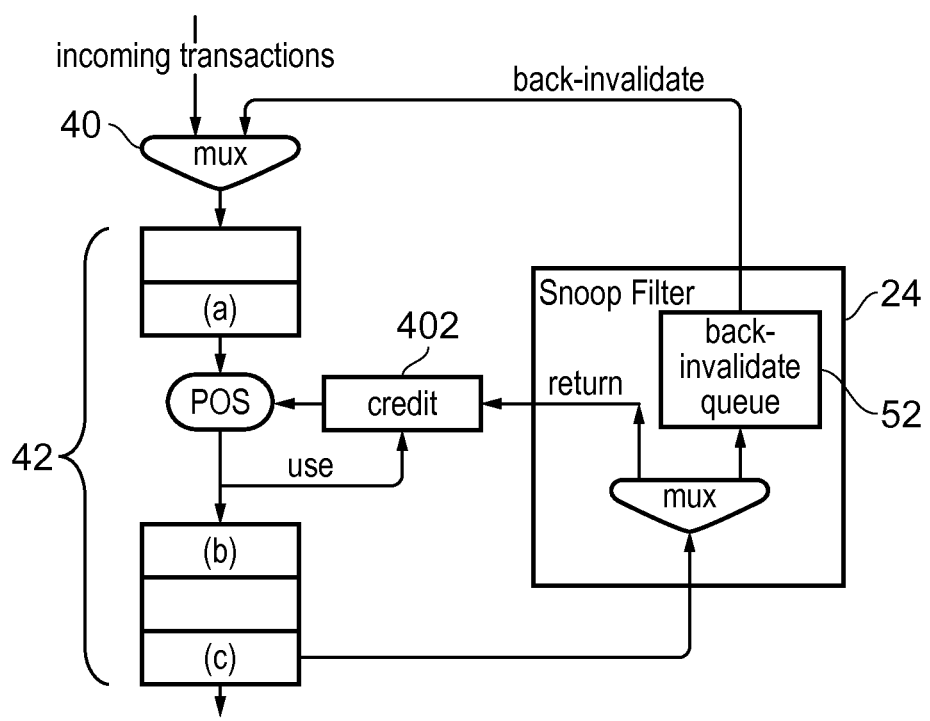
FIG. 8 shows an example of a credit mechanism for preventing the deadlock shown in FIG. 7.

As shown in FIG. 8, this type of deadlock can be avoided by preventing non-invalidate transactions from progressing beyond the POS 400 if the eviction buffer 52 is full. This removes transaction (c) from the deadlock loop because it is not possible for a transaction to reach the point at which invalidate transactions are triggered unless there will be space in the eviction buffer 52 to handle another invalidate transaction (the snoop filter lookup for a transaction may occur after the transaction has passed the POS 400). Hence, transaction (c) cannot be stalled, meaning that transaction (b) having the same transaction ID can then be processed, allowing a pending invalidate transaction (a) for the same address as transaction (b) to progress beyond the POS 400.

FIG. 8 shows an example implementation in which a credit mechanism 402 is provided in the coherency controller 22 or the snoop filter 24 to track whether the eviction buffer 52 is full. When a transaction other than an invalidate transaction passes the POS 400, a credit is consumed. When an invalidate transaction completes, or a non-invalidate transaction does not trigger an invalidate transaction, then a credit is released. If a predetermined number of credits (corresponding to the number of entries in the eviction buffer) have been consumed but not yet released, then transactions other than invalidate transactions may not progress beyond the POS 400. This ensures that it is not possible for a transaction (c) to be stalled beyond the POS 400 due to insufficient space in the eviction buffer 52.

The credit mechanism 402 may for example be implemented using a counter which may be incremented/decremented in one direction when a credit is consumed and in the opposite direction when a credit is released. For example, the counter may be initialised at a number corresponding to the number of entries in the eviction buffer, count down towards zero each time a credit is consumed (used), count away from zero each time a credit is a released, and transactions may not pass the POS 400 when the counter is at zero. Alternatively, the counter could start at zero, count up each time a credit is consumed, count down each time a credit is released, and prevent transactions passing the POS 400 when the counter is equal to the number of eviction buffer entries. More generally, the counter may count between an initialization value and a second value indicating that no more transactions should pass the POS 400, where the number of increments/decrements between the initialization value and the second value is equal to the number of eviction buffer entries.

When a credit mechanism 402 is provided as shown in FIG. 8, there may be no need for a retry signal 70 as shown in FIG. 3. At least one reserved slot 62 may still be provided in the part of the transaction queue 42 preceding the POS 400, as in the example of FIG. 3, to ensure that an invalidate transaction can enter the transaction queue 42.

Figure 9:
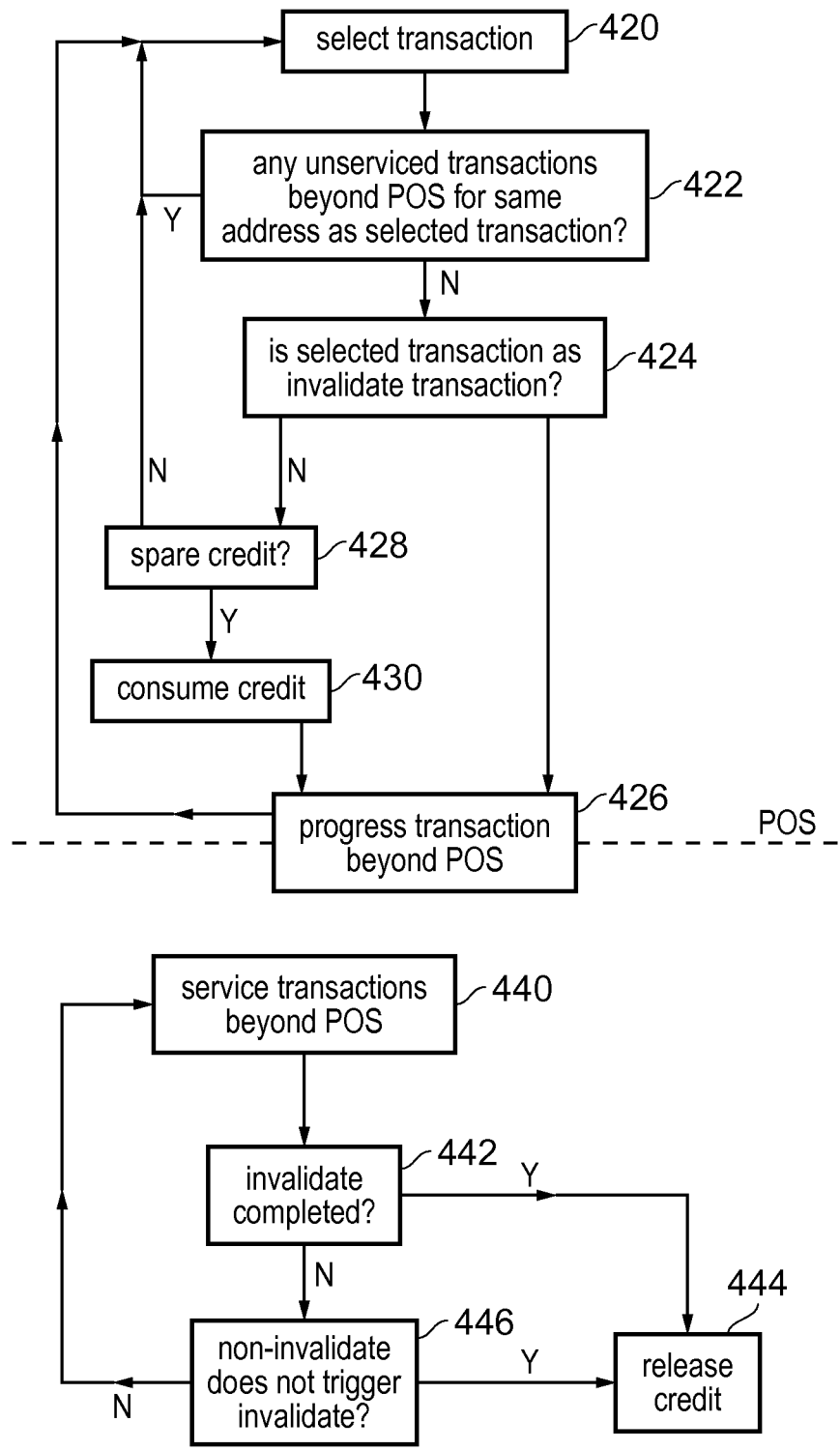
FIG. 9 is a flow diagram showing an example of controlling servicing of transactions using credits.

FIG. 9 shows a flow diagram illustrating the use of credits to prevent deadlocks of the type shown in FIG. 7. The top part of FIG. 9 shows operations performed to determine whether a transaction may progress beyond the POS 400. At step 420, a transaction is selected from one of the slots in the portion of the transaction queue 42 preceding the POS 400. Various arbitration techniques may be used to decide which transaction to select. At step 422, it is determined whether there are any unserviced transactions beyond the POS 400 which specify the same address as the selected transaction. Different coherency protocols may consider a transaction to have been serviced at different times. In some implementations, a transaction may be considered to be serviced if it has been issued to its destination device. Other examples may require an acknowledgement to be received from the destination device before a transaction is considered serviced, or some other indication that the transaction has completed sufficiently may be required. If there are any unserviced transactions for the same address, then an address hazard has been detected, and so the selected transaction cannot pass the POS 400. The method returns to step 420 to select another transaction, since there may be other transactions which do not encounter an address hazard.

If there are no unserviced transactions beyond the POS 400 specifying the same address as the selected transaction, it is determined at step 424 whether the selected transaction is an invalidate transaction. If so, the invalidate transaction is allowed to progress beyond the POS 400 at step 426. The credit mechanism 402 does not apply to invalidate transactions, because invalidate transactions will not trigger any further invalidation and so cannot cause the deadlock described above, and because processing of the invalidate transaction will help to make space in the eviction buffer 52 so that other transactions requiring invalidations can progress.

If the selected transaction is not an invalidate transaction, then at step 428 it is determined whether there is a spare (unconsumed) credit. For example, the credit counter may be checked to see whether it is at zero or some other value which indicates that there are no spare credits. If there are no spare credits, the transaction is prevented from progressing past the POS 400. The method returns to step 420 where another transaction is selected. The arbitration algorithm for selecting transactions at step 420 may in some cases favour selecting invalidate transactions when the credit mechanism 402 indicates that there are no spare credits, to increase the likelihood that forward progress can be made. Alternatively, if there are no spare credits, the method could simply wait at step 428 until a credit becomes available again.

On the other hand, if there is a spare credit, then at step 430 the credit is consumed and at step 426 the transaction is allowed to progress beyond the POS 400.

The bottom part of FIG. 9 shows operations performed for transactions beyond the POS 400. These operations may be performed in parallel with the pre-POS operations shown in the top part of FIG. 9. Snoop filter lookups may be performed for the transactions beyond the POS to determine what snoop transactions should be issued. At step 440, transactions in the transaction queue 42 beyond the POS 400 are selected for servicing. This selection may consider any ordering requirement imposed on groups of transactions, for example using the transaction ID.

At step 442 it is determined whether an invalidate transaction has completed. For example, the invalidate transaction may be considered complete when the device to which the invalidate transaction was sent has acknowledged the transaction to confirm that it will be invalidating the data from its cache. If an invalidate transaction has completed, then at step 444 a credit is released since at this point the entry of the eviction buffer 52 corresponding to that invalidation transaction can be made available for other invalidate transactions.

Also, at step 446 it is determined whether any non-invalidate transaction has progressed without triggering an invalidation. If so, a credit is released at step 444, because this means there is still space in the eviction buffer so that another non-invalidate transaction can progress beyond the POS 400 without risk of stalling and causing the deadlock shown in FIG. 7.

It will be appreciated that does not show all the operations carried out by the coherency control circuitry 22, and that many other operations could be performed too. Also, it will be appreciated that the operations shown in FIG. 9 could be performed in a different order.

The credit mechanism discussed above need not apply to all transactions. In some cases, only one or more types of transaction may require the credit and other types of transactions may be allowed to proceed regardless of whether a credit is available. For example, the credit mechanism may only apply to coherent transactions, and non-coherent transactions, which do not pass the POS and so cannot trigger invalidate transactions (avoiding the deadlock), may be allowed to proceed regardless of whether a credit is available.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An interconnect for connecting devices in an integrated circuit, the interconnect comprising:
    coherency control circuitry capable of performing coherency control operations for transactions received by the interconnect from the devices, and determining transactions to be serviced by the devices based on the coherency control operations; and
    a snoop filter capable of identifying which devices have cached data for a target address of a transaction received by the interconnect, the snoop filter comprising at least one snoop filter entry for identifying which devices have cached data for a corresponding memory address;
    wherein in response to a transaction specifying a target address other than an address having a corresponding snoop filter entry in the snoop filter, the snoop filter is capable of allocating a new snoop filter entry for the target address;
    when one or more snoop filter entries which can be allocated for the target address are already allocated to another address, then the snoop filter is capable of selecting a victim snoop filter entry corresponding to a victim address, and issuing an invalidate transaction for invalidating the cached data for the victim address at one or more of the devices; and
    the coherency control circuitry is capable of performing the coherency control operations for the invalidate transaction issued by the snoop filter, to determine when the invalidate transaction can be serviced;
    wherein at least one of the coherency control circuitry and the snoop filter comprises a credit mechanism to consume a credit in response to a transaction other than an invalidate transaction progressing beyond a predetermined point, and to release a credit in response to an invalidate transaction being serviced or a determination that the transaction other than an invalidate transaction will not cause an invalidate transaction to be issued; and the coherency control circuitry is capable of preventing a transaction other than the invalidate transaction progressing beyond said predetermined point when a predetermined number of credits have been consumed and not yet released.

2. The interconnect according to claim 1, wherein the coherency control operations comprise at least one of:
hazard checking; and
controlling an order in which transactions are serviced.

3. The interconnect according to claim 1, wherein the coherency control operations for the invalidate transaction comprise detecting whether the interconnect has received another transaction specifying the victim address.

4. The interconnect according to claim 1, wherein the coherency control circuitry is capable of issuing the invalidate transaction to said one or more of the devices.

5. The interconnect according to claim 1, wherein in response to a transaction specifying a target address, the coherency control circuitry is capable of issuing snoop transactions to devices identified by the snoop filter as having the cached data for the target address.

6. The interconnect according to claim 1, wherein the snoop filter comprises an eviction buffer;
wherein when the one or more snoop filter entries which can be allocated for the target address are already allocated to another address, then the snoop filter is capable of writing data from the victim snoop filter entry to the eviction buffer before reallocating the victim snoop filter entry to be the new snoop filter entry for the target address.

7. The interconnect according to claim 6, wherein in response to a transaction specifying a target address, the coherency control circuitry is capable of looking up both the snoop filter and the eviction buffer to determine which devices have cached data for the target address.

8. The interconnect according to claim 6, wherein when the one or more snoop filter entries which can be allocated for the target address are already allocated to another address and the eviction buffer is full, then the snoop filter is capable of issuing a retry signal to the coherency control circuitry to indicate that the transaction specifying the target address cannot be serviced yet.

9. The interconnect according to claim 6, wherein the snoop filter is capable of removing data corresponding to a specified victim address from the eviction buffer in response to a signal from the coherency control circuitry specifying the specified victim address.

10. The interconnect according to claim 1, wherein the coherency control circuitry comprises a transaction queue comprising a plurality of queue entries for holding transactions;
the coherency control circuitry is capable of selecting transactions to be serviced from among the transactions held in the transaction queue; and
at least one of the queue entries is reserved for invalidate transactions issued by the snoop filter.

11. The interconnect according to claim 1, wherein the coherency control circuitry is capable of arbitrating between the invalidate transaction and the transactions received by the interconnect using an arbitration scheme which guarantees that the invalidate transaction will eventually be selected for servicing ahead of transactions received by the interconnect.

12. The interconnect according to claim 1, wherein the predetermined number of credits is dependent on a number of entries in an eviction buffer for storing information evicted from the victim snoop filter entry while the invalidation transaction is pending.

13. An interconnect for connecting devices in an integrated circuit, the interconnect comprising:
coherency control circuitry capable of performing coherency control operations for transactions received by the interconnect from the devices, and determining transactions to be serviced by the devices based on the coherency control operations; and
a snoop filter capable of identifying which devices have cached data for a target address of a transaction received by the interconnect, the snoop filter comprising at least one snoop filter entry for identifying which devices have cached data for a corresponding memory address;
wherein in response to a transaction specifying a target address other than an address having a corresponding snoop filter entry in the snoop filter, the snoop filter is capable of allocating a new snoop filter entry for the target address;
when one or more snoop filter entries which can be allocated for the target address are already allocated to another address, then the snoop filter is capable of selecting a victim snoop filter entry corresponding to a victim address, and issuing an invalidate transaction for invalidating the cached data for the victim address at one or more of the devices; and
the coherency control circuitry is capable of performing the coherency control operations for the invalidate transaction issued by the snoop filter, to determine when the invalidate transaction can be serviced;
wherein the snoop filter comprises an eviction buffer, and when the one or more snoop filter entries which can be allocated for the target address are already allocated to another address, then the snoop filter is capable of writing data from the victim snoop filter entry to the eviction buffer before reallocating the victim snoop filter entry to be the new snoop filter entry for the target address; and
wherein the coherency control circuitry is capable of preventing a transaction other than the invalidate transaction progressing beyond a predetermined point when the eviction buffer is full.

14. The interconnect according to claim 13, wherein the coherency control circuitry is capable of preventing a transaction specifying a first address progressing beyond said predetermined point when another transaction specifying said first address has progressed beyond said predetermined point and has not yet been serviced.

15. The interconnect according to claim 13, wherein for at least one group of transactions, the coherency control circuitry is capable of controlling the transactions to be serviced in a predetermined order.

16. A coherency control method for an integrated circuit comprising a plurality of devices, the method comprising:
performing coherency control operations for transactions received from the devices, and determining transactions to be serviced by the devices based on the coherency control operations;
in response to a transaction specifying a target address, identifying which devices have cached data for the target address using a snoop filter comprising at least one snoop filter entry for identifying which devices have cached data for a corresponding memory address;

when the target address is an address other than an address having a corresponding snoop filter entry in the snoop filter, allocating a new snoop filter entry for the target address;

when one or more snoop filter entries which can be allocated for the target address are already allocated to another address, selecting a victim snoop filter entry corresponding to a victim address, and issuing an invalidate transaction for invalidating the cached data for the victim address at one or more of the devices; and performing the coherency control operations for the invalidate transaction issued by the snoop filter, to determine when the invalidate transaction can be serviced, wherein the same coherency control circuitry performs the coherency control operations for both the transactions received from the devices and the invalidate transaction issued by the snoop filter;

consuming a credit in response to a transaction other than an invalidate transaction progressing beyond a predetermined point;

releasing a credit in response to an invalidate transaction being serviced or a determination that the transaction other than an invalidate transaction will not cause an invalidate transaction to be issued; and preventing a transaction other than the invalidate transaction progressing beyond said predetermined point when a predetermined number of credits have been consumed and not yet released.

17. A coherency control device for an interconnect for connecting devices in an integrated circuit, the coherency control device comprising:

a transaction interface capable of receiving data access transactions received by the interconnect from the devices, and receiving invalidate transactions from a snoop filter, the invalidate transactions for invalidating cached data for a victim address at one or more of the devices;

a transaction queue capable of queueing the data access transactions and the invalidate transactions received from the transaction interface; and coherency control circuitry capable of performing coherency control operations for both the data access transactions and the invalidate transactions, and based on the coherency control operations, selecting transactions from the transaction queue for servicing by the devices;

wherein the coherency control device comprises a credit mechanism to consume a credit in response to a transaction other than an invalidate transaction progressing beyond a predetermined point, and to release a credit in response to an invalidate transaction being serviced or a determination that the transaction other than an invalidate transaction will not cause an invalidate transaction to be issued; and the coherency control circuitry is capable of preventing a transaction other than the invalidate transaction progressing beyond said predetermined point when a predetermined number of credits have been consumed and not yet released.

18. A coherency control device for an interconnect for connecting devices in an integrated circuit, the coherency control device comprising:

means for receiving data access transactions received by the interconnect from the devices, and for receiving invalidate transactions from a snoop filter, the invalidate transactions for invalidating cached data for a victim address at one or more of the devices;

means for queuing the data access transactions and the invalidate transactions received from the means for receiving; and means for performing coherency control operations for both the data access transactions and the invalidate transactions, and based on the coherency control operations, selecting transactions from the transaction queue for servicing by the devices;

wherein the coherency control device comprises means for consuming a credit in response to a transaction other than an invalidate transaction progressing beyond a predetermined point, and means for releasing a credit in response to an invalidate transaction being serviced or a determination that the transaction other than an invalidate transaction will not cause an invalidate transaction to be issued; and the means for performing coherency control operations is capable of preventing a transaction other than the invalidate transaction progressing beyond said predetermined point when a predetermined number of credits have been consumed and not yet released.

19. A coherency control method for an integrated circuit comprising a plurality of devices; the method comprising:

receiving data access transactions received by the interconnect from the devices;

receiving invalidate transactions from a snoop filter, the invalidate transactions for invalidating cached data for a victim address at one or more of the devices;

queuing the data access transactions and the invalidate transactions in a transaction queue;

performing coherency control operations for both the data access transactions and the invalidate transactions using the same coherency control circuitry; and based on the coherency control operations, selecting transactions from the transaction queue for servicing by the devices;

consuming a credit in response to a transaction other than an invalidate transaction progressing beyond a predetermined point;

releasing a credit in response to an invalidate transaction being serviced or a determination that the transaction other than an invalidate transaction will not cause an invalidate transaction to be issued; and preventing a transaction other than the invalidate transaction progressing beyond said predetermined point when a predetermined number of credits have been consumed and not yet released.

20. A snoop filter for an integrated circuit comprising a plurality of devices; the snoop filter comprising:

a data store comprising at least one snoop filter entry for identifying which devices have cached data for a corresponding memory address; and control circuitry capable of determining, in response to a target address, whether the data store comprises a corresponding snoop filter entry for the target address;

wherein when the target address is an address other than an address having a corresponding snoop filter entry in the data store, then the control circuitry is capable of allocating a new snoop filter entry in the data store for the target address; and when one or more snoop filter entries which can be allocated for the target address are already allocated to another address, then the control circuitry is capable of selecting a victim snoop filter entry corresponding to a victim address, and issuing an invalidate transaction to coherency control circuitry separate from the snoop filter, the invalidate transaction for invalidating the cached data for the victim address at one or more of the devices;

wherein the snoop filter comprises a credit mechanism to consume a credit in response to a transaction other than an invalidate transaction progressing beyond a predetermined point, and to release a credit in response to an invalidate transaction being serviced or a determination that the transaction other than an invalidate transaction will not cause an invalidate transaction to be issued.

21. A snoop filter for an integrated circuit comprising a plurality of devices; the snoop filter comprising:

means for storing data, the means for storing data comprising at least one snoop filter entry for identifying which devices have cached data for a corresponding memory address; and means for determining, in response to a target address, whether the means for storing data comprises a corresponding snoop filter entry for the target address;

wherein when the target address is an address other than an address having a corresponding snoop filter entry in the means for storing data, then the means for determining is capable of allocating a new snoop filter entry in the data store for the target address; and when one or more snoop filter entries which can be allocated for the target address are already allocated to another address, then the means for determining is capable of selecting a victim snoop filter entry corresponding to a victim address, and issuing an invalidate transaction to coherency control circuitry separate from the snoop filter, the invalidate transaction for invalidating the cached data for the victim address at one or more of the devices;

wherein the snoop filter comprises means for consuming a credit in response to a transaction other than an invalidate transaction progressing beyond a predetermined point, and means for releasing a credit in response to an invalidate transaction being serviced or a determination that the transaction other than an invalidate transaction will not cause an invalidate transaction to be issued.

22. A method for a snoop filter comprising at least one snoop filter entry for identifying which devices of an integrated circuit have cached data for a corresponding memory address; the method comprising:

in response to a target address, determining whether the snoop filter comprises a corresponding snoop filter entry for the target address;

when the target address is an address other than an address having a corresponding snoop filter entry, then allocating a new snoop filter entry in the data store for the target address;

when one or more snoop filter entries which can be allocated for the target address are already allocated to another address, then selecting a victim snoop filter entry corresponding to a victim address, and issuing an invalidate transaction to coherency control circuitry separate from the snoop filter, the invalidate transaction for invalidating the cached data for the victim address at one or more of the devices;

consuming a credit in response to a transaction other than an invalidate transaction progressing beyond a predetermined point; and releasing a credit in response to an invalidate transaction being serviced or a determination that the transaction other than an invalidate transaction will not cause an invalidate transaction to be issued.

* * * * *